May 6, 1941.　　C. HAMPE ET AL　　2,241,089
PIPE COUPLING CLAMP
Filed Jan. 18, 1940
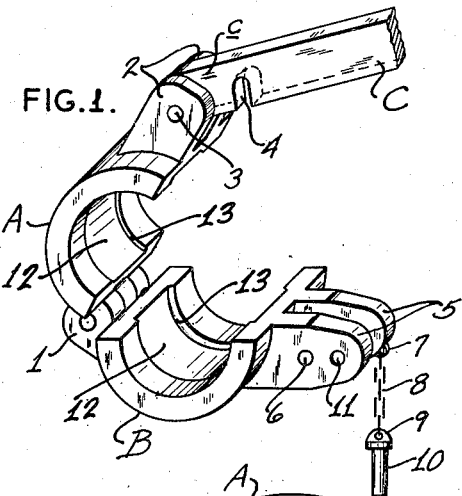
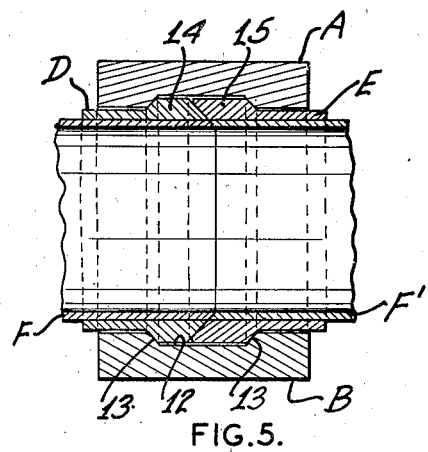
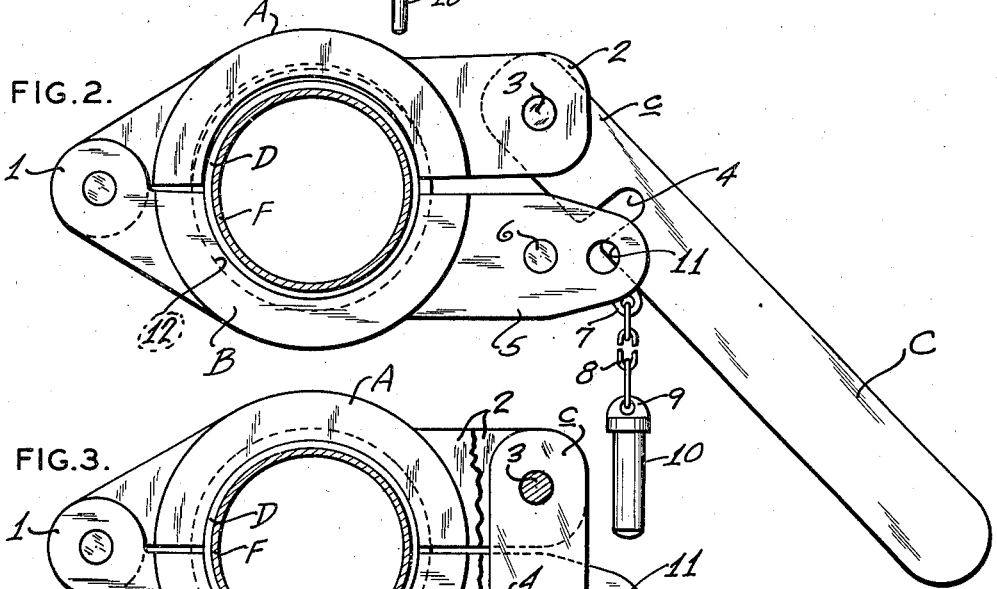
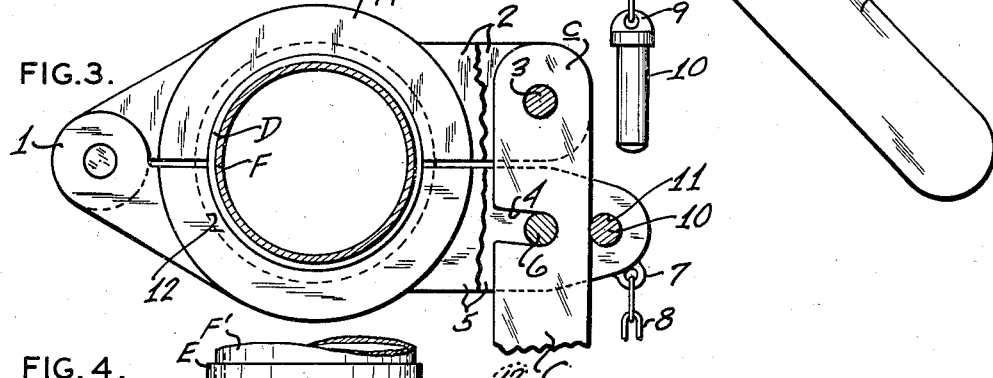
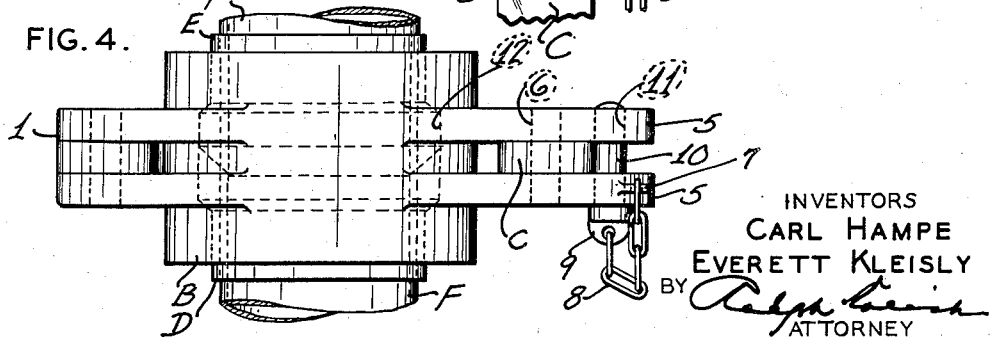
INVENTORS
CARL HAMPE
EVERETT KLEISLY
BY
ATTORNEY Patented May 6, 1941

2,241,089

UNITED STATES PATENT OFFICE 2,241,089

PIPE COUPLING CLAMP

Carl Hampe and Everett Kleisly, St. Louis, Mo., assignors of one-third to Otto A. Hampe, St. Louis, Mo.

Application January 18, 1940, Serial No. 314,482

1 Claim. (Cl. 285—129)

This invention relates to a certain new and useful improvement in pipe coupling clamps.

In certain industries, such, for instance, as the milk and beverage bottling industries, the pipes and vessels in which the beverage is conveyed and handled must be repeatedly thoroughly and hygienically cleansed. In fact, in numerous cities throughout this and other countries, the maintenance of sanitary conditions in plants of the character mentioned is rigidly governed by statute and regulations.

In particularly the milk bottling industry in the United States, most large municipalities have milk regulation ordinances, which, among other things, require that all the pipes and vessels with which the beverage comes into direct contact must be emptied at regular stated periods and thoroughly cleaned. The regulations set up under these ordinances frequently require that even conduit pipes through which the liquid is conveyed must be taken apart every day and thoroughly cleaned out. These regulations even go so far as to specify the particular type of pipe which must be used, the size of the pipe, the maximum permissible angularity of the bends in the pipe, and the particular manner in which the pipes may be connected to each other and to the vessels into which the beverage flows.

The regulations covering the pipe connecting fittings prevent the use of ordinary pipe connections, such as the sleeve and nipple type, and, instead, require the use of various types of so-called sanitary unions. These sanitary unions are variously constructed to meet the requirements of the regulations. However, experience and research have shown that even the approved type of unions available at the present time in some manner or other have a nonaccessible crevice between the pipe and the fitting, in which various pathogenic spores may accumulate with resultant deleterious effect upon the beverage. In the case of hot milk moving through pipes from the pasteurizer to the cooling towers, the faces of the pipe fittings in the course of even one day's operation will become caked with a thick scum that must be scraped away and removed from the metallic surface. Obviously, therefore, fittings of this character should preferably be so arranged that any crevices or juncture points are readily accessible and may be easily scraped or otherwise cleansed to prevent accumulation of deleterious bacterial matter.

Apart from the purely hygienic aspect, there are a number of practical considerations involved. It will be apparent that sanitary pipe fittings of the character under discussion must necessarily be taken apart and again assembled with relatively great frequency, thereby producing considerable wear and consequent need for replacement. Under such conditions, it is desirable that the pipe fitting be simple in construction, so that they may be readily taken apart and re-assembled quickly and conveniently. In addition, it is extremely desirable that such a fitting may be readily replaced or reconditioned simply, speedily, and economically.

It is hence an object of the present invention to provide a pipe coupling or fitting which is extremely sanitary, presenting entirely accessible and thoroughly cleansable surfaces, which is simple, economical, and yet sturdy and rugged in construction, which may be installed and utilized with a minimum of labor and expense, which may be readily maintained and replaced in a relatively speedy, efficient, and economical manner, and which is highly efficient in the performance of its intended functions.

And with the above and other objects in view, our invention resides in the novel features of form, construction, arrangement, and combination of parts presently described and pointed out in the claim.

In the accompanying drawing—

Figure 1 is a reduced perspective view of an opened pipe coupling member or clamp embodying our present invention;

Figures 2 and 3 are side elevational views of the clamp in partially and fully closed positions, respectively;

Figure 4 is a top plan view of the clamp; and

Figure 5 is a longitudinal sectional view of the clamp in closed or endwise coupling position upon the shouldered end-portions of opposed pipe sections.

Referring now in more detail and by reference characters to the drawing, which illustrates a preferred embodiment of our invention, the pipe coupling member or clamp comprises a pair of companion semi-cylindrical members A, B, hinged together in opposing relation along one of their margins, as at 1.

The member A is provided preferably integrally adjacent its other margin with a pair of longitudinally spaced parallel ears 2 suitably apertured for seating a cross pivot pin 3.

Having an end-portion c snugly disposed, and by means of the pin 3 permanently secured pivotally, between the ears 2, is a swingable locking-bar or lever C provided adjacent its end c with a cam-slot 4, which, as shown, opens upon a side margin of the lever C and extends transversely inwardly at an angle oblique to the longitudinal axis thereof, for purposes presently fully appearing.

The co-operable member B is similarly provided adjacent its free margin with a pair of outwardly projecting spaced parallel ears 5 positioned in registering alignment with the ears 2 of the complementary member A, and fixed at its ends in, and extending longitudinally between, the ears 5, is a cross-pin 6 sized for snug-fitting engagement within the cam-slot 4 of the lever or bar C and positioned with respect to the axes of the hinge 1 and the lever C so as to initially engage the cam-slot 4 when the members or sections A, B, are in so-called non-concentric relation, all as best seen in Figure 2.

The ears 5 are somewhat elongated relatively to the ears 2 and having its one end-link suitably fixed to an eye 7 formed upon the outwardly presented marginal face of one of the ears 5, as shown, is a flexible chain 8 having its opposite end link engaged with a suitable eye 9 of a locking-pin 10 diametrally sized for fitting snugly, but removably, through suitable apertures 11 in the ears 5 for preventing disengagement of the locking bar or lever C at its slot 4 from the pin 6, all as best seen in Figures 3 and 4.

On their respective inner peripheral faces, the members A, B, are provided circumferentially with complementary shallow grooves 12 having wedge-like beveled or inclined side walls 13, the grooves 12 and their inclined side walls 13 being sized and contoured for close-fitting and wedging engagement with annular shoulders 14, 15, of complementarily machined and ground coupling sleeves D, E, suitably fitted and secured upon the ends of pipe sections F, F', preferably in the manner fully disclosed and described in United States Letters Patent No. 2,148,747, granted to us February 28, 1939, to which reference is made.

It will, of course, be understood in this connection that the present clamp is equally applicable to the coupling of pipe sections fitted with coupling sleeves or members of different designs and types and secured to the pipe sections in any conventional manner, it being merely necessary to form the groove 12 and associated marginal or side faces 13 to fit such other or particular pipe coupling sleeves or members.

In use and operation, the pipe sections F, F', having been suitably equipped with coupling sleeves D, E, as previously described, are manually brought together into more or less proximate abutment. The clamp is then opened, as shown in Figure 1, and suitably disposed around the loosely abutting coupling sleeves D, E. Thereupon, the clamp members A, B, are manually brought together as well as may be accomplished with ordinary manual strength, and the locking bar C swung to dispose the cam-slot 4 thereof into engagement with the pin 6, as illustrated in Figure 2. In such position, the members A, B, at their grooves 12 will come into more or less loose annularly embracing engagement with the shoulders 14, 15, of the sleeves D, E. As the locking bar C is swung inwardly, the pin 6 and the cam-slot 4 will co-act to draw the co-operable members or sections A, B, clampingly together with great force, and the marginal or side walls 13 of the groove 12 will exert a tremendous wedging pressure upon the annular shoulders 14, 15, of the sleeves D, E, thereby drawing the pipe-sections F, F', axially together in the formation therebetween of a tight thoroughly leak-proof joint, as best seen in Figure 5.

When the coupling action of the clamp is completed, the pin 10 may be inserted through the ear apertures 11 for securing the locking bar C against unauthorized removal, as best seen in Figures 3 and 4. However, on removal of the pin 10, the locking bar C may be swung outwardly and the clamp very quickly reopened and removed, thereby permitting facile separation of the pipe sections F, F', for cleansing or other purpose.

It will be evident that, by our present invention, we provide a pipe coupling member or clamp which is not only simple and economical in construction, but which may be with unusual speed opened or closed. In addition, the coupling member may be very simply removed in its entirety for cleaning or sterilization. In fact, the coupling member of our present invention is unusually accessible for cleaning operations and may be thoroughly scrubbed inside and out before replacement upon the pipe, thereby meeting with facility and convenience all statutory and other such requirements and regulations.

It should be understood that changes and modifications in the form, construction, arrangement, and combination of the several parts of the clamp may be made and substituted for those herein shown and described without departing from the nature and principle of our invention.

Having thus described our invention, what we claim and desire to secure by Letters Patent is:

A clamp including a pair of pivotally connected semi-cylindrical companion members each having a circumferential groove on its inner face having oblique side walls, said members pivotally connected at a point spaced outwardly from the axial line of the clamp by a distance substantially greater than the external radius of the clamp and adapted for encircling disposition upon the end portions of opposed pipe sections having shoulders of complementary shape for engagement in said grooves, and means for drawing the free ends of the members toward each other for clamping engagement around the shouldered pipe sections whereby, upon application to the pipe sections, the walls of the groove progressively engage said shoulder.

CARL HAMPE.
EVERETT KLEISLY.